United States Patent [19]

Ogawa et al.

[11] Patent Number: 4,823,713

[45] Date of Patent: Apr. 25, 1989

[54] SEWING MACHINE WITH AN ULTRASONIC HEATER FOR FOLDING BACK SEWN EDGES

[75] Inventors: Yoshitake Ogawa, Kasugai; Akira Takeuchi, Obu; Hisataka Mizutani, Bisai, all of Japan

[73] Assignee: Brother Kogyo Kabushiki Kaisha, Japan

[21] Appl. No.: 105,222

[22] Filed: Oct. 7, 1987

[30] Foreign Application Priority Data

Oct. 31, 1986 [JP] Japan ................................ 61-261369
Nov. 12, 1986 [JP] Japan ................................ 61-268878

[51] Int. Cl.⁴ ............................................ D05B 35/02
[52] U.S. Cl. .................................. 112/217; 112/147; 156/580.1
[58] Field of Search ........................ 156/580.1, 580.2; 219/121 EA; 112/217, 41, 147, 407, 235; 38/1 B

[56] References Cited

U.S. PATENT DOCUMENTS 2,753,823  7/1956  Judelson .
3,378,429  4/1968  Obeda ......................... 156/580.2 X
3,493,457  2/1970  Jugler .
3,524,085  8/1970  Shoh .
3,734,805  5/1973  Obeda et al. ...................... 156/580.1
3,934,525  1/1976  Aldred .
4,047,992  9/1977  Williams et al. ............. 156/580.1 X
4,161,420  7/1979  Clark et al. ......................... 112/407
4,495,879  1/1985  Yamamoto .

FOREIGN PATENT DOCUMENTS 1109973  4/1968  United Kingdom .

Primary Examiner—Andrew M. Falik
Attorney, Agent, or Firm—Oliff & Berridge

[57] ABSTRACT

A sewing machine for sewing together two sheets of material and for separating and pressing their edges, includes folding means for separating and folding the edges and an ultrasonic generator for pressing and creasing them. An additional device includes a speed sensor for sensing a sewing speed of the sewing machine and a control device for controlling the ultrasonic generator to vary a strength of the ultrasonic wave according to the sensed sewing speed.

8 Claims, 13 Drawing Sheets

SEWING MACHINE WITH AN ULTRASONIC HEATER FOR FOLDING BACK SEWN EDGES

BACKGROUND OF THE INVENTION

This invention relates to a sewing machine with a creasing apparatus for separating and pressing two edges of two sheets of material to make an open seam, which is used in one process of the production of a pair of trousers, a jacket or the like.

Devices of this type are disclosed in U.S. Pat. Nos. 4,495,879 and in 3,934,525.

Figure 12:
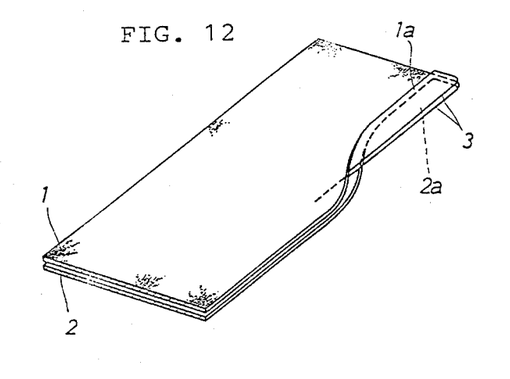
FIG. 12 is a perspective view of two cloths sewn together and whose edges are folded apart.

As shown in FIG. 12, these apparatuses sew together upper and lower cloths 1 and 2, separate and fold apart both edges 1a and 2a of the cloths 1 and 2, and make creases 3 along the folds. These creases 3 have been made by pressing with an iron, an electric heated puller, or the like. Use of the electric heater results in significant inefficiency, because it requires a long time to heat up the iron before starting, and also to cool down after finishing. Further, during operation, an operator might accidentally be burned by the heated iron. Moreover, it is difficult to modulate the temperature of the electric iron in response to the sewing speed of the sewing machine, in order to keep heat received by the unit length of the cloths constant irrespective of the sewing speed.

SUMMARY OF THE INVENTION

An object of the present invention is to provide a more efficient and safer sewing machine with means for separating and pressing edges.

Another object of the present invention is to provide a sewing machine with the above-mentioned means, wherein the heating temperature can be controlled in accordance with the sewing speed.

According to the present invention, a sewing machine for sewing edges of two sheets of material, for folding back the sewn edges and for creasing the folded edges, includes a stitch forming mechanism for forming a stitch at a sewing point; a feeding mechanism for feeding the two sheets of material through the sewing point; a folder for folding back the edges of the two sheets of material; an anvil provided at the downstream side of the folder with respect to the feeding direction of the material; an ultrasonic horn cooperating with the anvil to heat and thus crease the folded edges of the two sheets of material by means of ultrasonic waves; and an ultrasonic generator provided for the ultrasonic horn.

The sewing machine can further include a speed sensor for sensing a sewing speed of the sewing machine; and a control device for controlling the ultrasonic generator to vary an intensity of the ultrasonic wave in response to the sensed sewing speed.

BRIEF DESCRIPTION OF THE DRAWINGS

For a more complete understanding of the present invention and advantages thereof, reference is now made to the following description taken in conjunction with the accompanying drawings in which.

DETAILED DESCRIPTION OF A PREFERRED EMBODIMENT

An embodiment of this invention will be described hereinafter.

Figure 1:
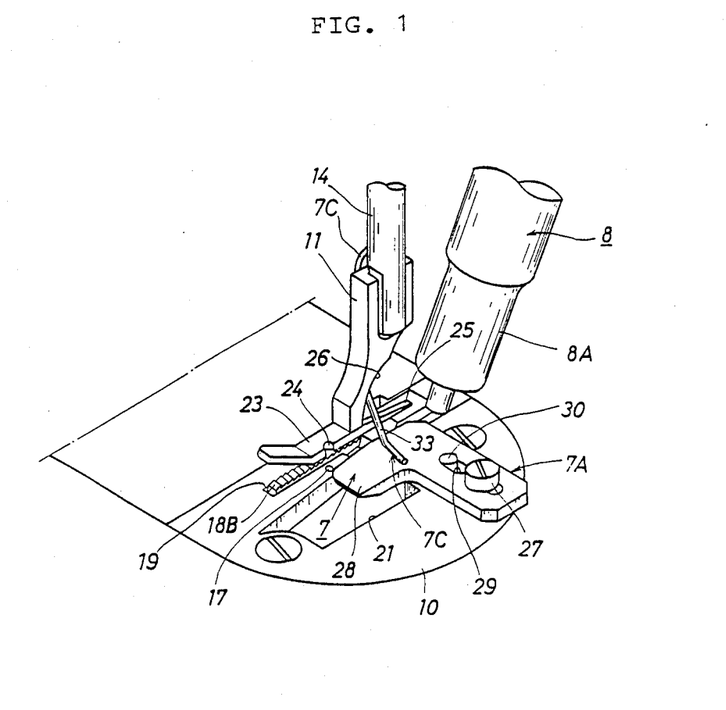
FIG. 1 is a perspective view of the main part of a sewing machine of an embodiment of this invention.
Figure 2:
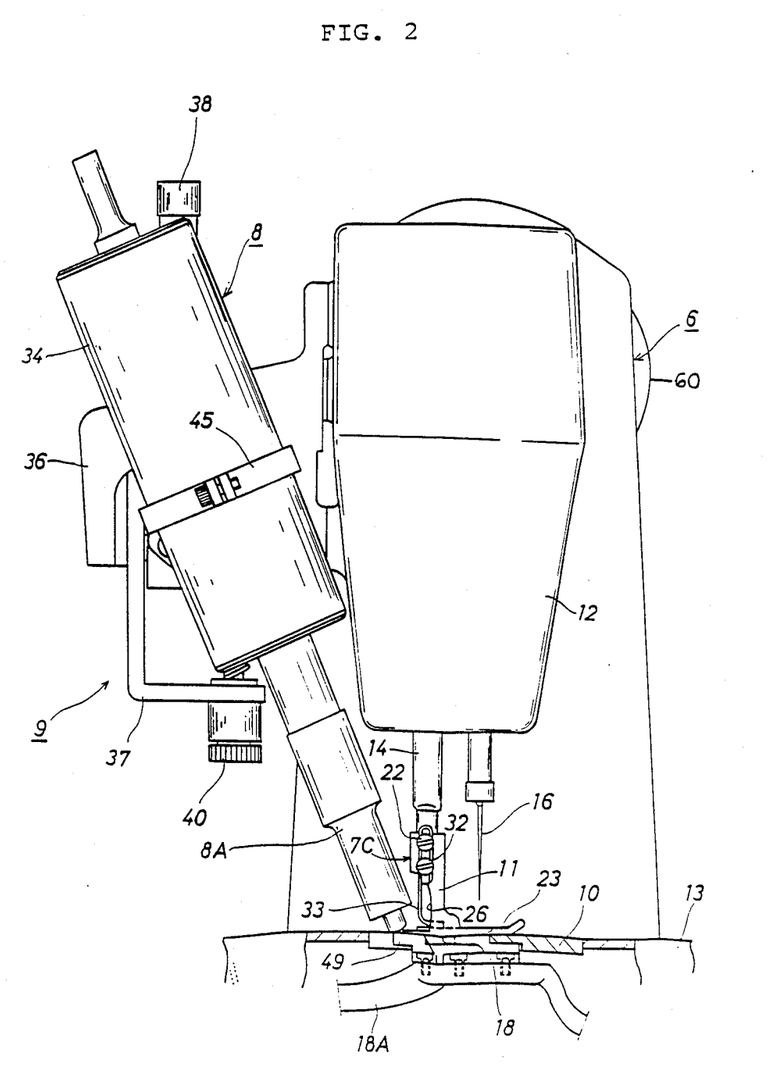
FIG. 2 is a side elevation view, partly in cross section of the bed of the sewing machine.

As shown in FIGS. 1 and 2, a sewing machine in accordance with this invention includes: a sewing head 6; a needle plate 10 for supporting the cloths 1 and 2; a presser foot 11 for pressing the cloths 1 and 2 against a feed dog 18; a folder 7 provided near the needle plate 10 and the presser foot 11; and an ultrasonic-wave generating apparatus 8.

The sewing machine is for straight lock stitches and sews together upper and lower cloths 1 and 2.

Figure 3:
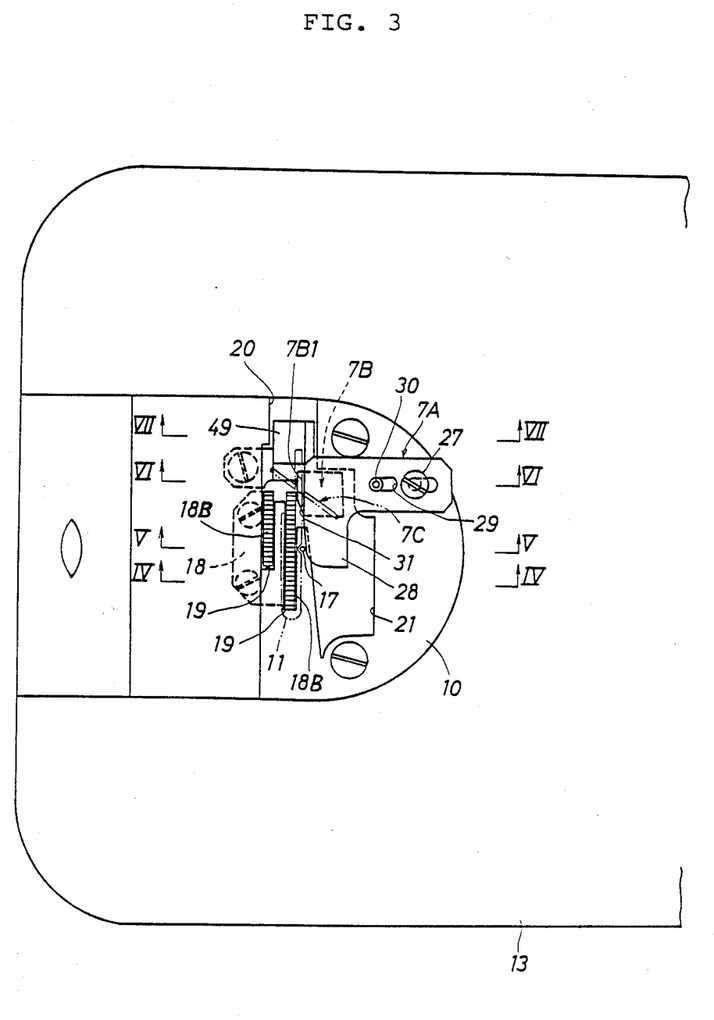
FIG. 3 is a plan view of a needle plate on the bed.
Figure 4:
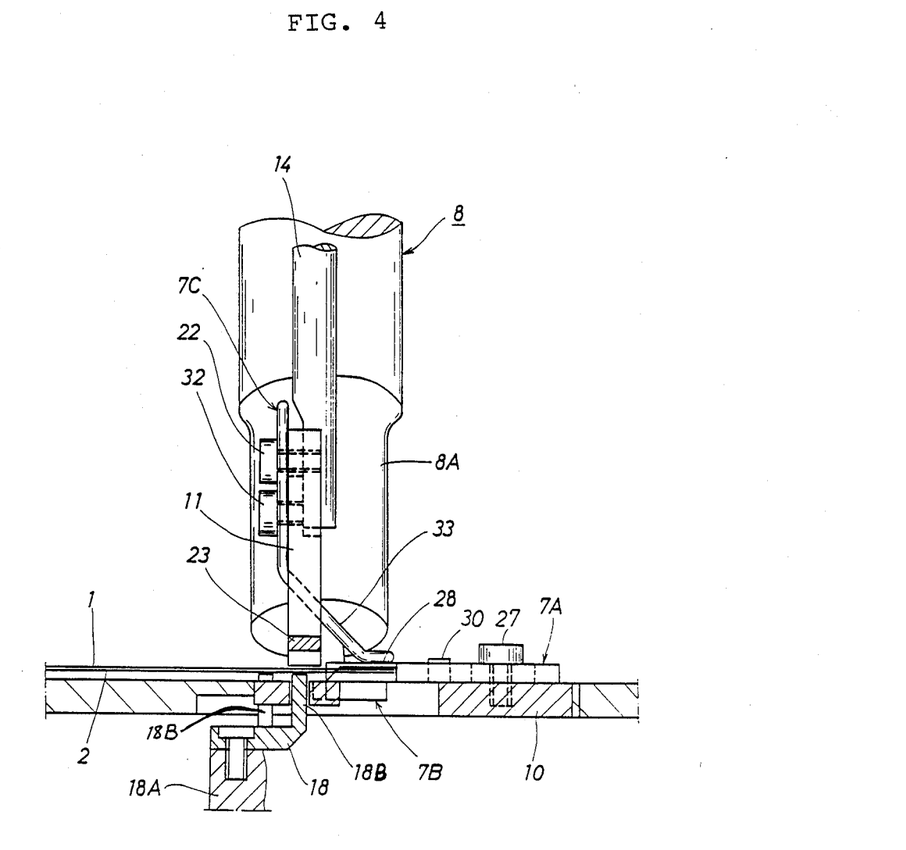
FIG. 4 is a sectional view taken along line IV—IV of FIG. 3.

The presser foot 11 attached at the lower end of a presser bar 14 is a special type for this creasing machine and assists the folder 7 to guide edges 1a and 2a of the cloths 1 and 2. As shown in FIG. 3, the needle plate 10 includes: a needle hole 17 through which a needle 16 (shown in FIG. 2) reciprocates; a couple of slots 19 on the left of the needle hole 17, in which, as shown in FIGS. 2 and 4 through 6, right and a left teeth 18B of the feed dog 18 on a feed bar 18A perform four motion feed by means of a feed mechanism (not shown) of the sewing head 6; an opening 20 at the rear of the slots 19; and a recess 21 which is formed on the right of the needle hole 17 and continues to the opening 20.

As shown in FIG. 1, the presser foot 11 attached to the lower end of the presser bar 14 by a presser clamp screw 22 (shown in FIG. 2) has a pressing portion 23 at its lower end. The pressing portion 23 has a semicircular needle recess 24 at its right through which the needle 16 reciprocates. The lower surface of the pressing portion 23 faces the slots 19 and the teeth 18B of the feed dog 18. A presser tongue 25 projects backward from the right rear end of the pressing portion 23. An arc recess 26 is formed at the rear bottom of the presser foot 11.

Next, the folder 7 will be described in detail hereinafter. The folder 7 guides to separate the edges 1a and 2a of the cloths 1 and 2 and folds them apart in accordance with feeding of the cloths 1 and 2 immediately after the cloths 1 and 2 are sewn together.

As shown in FIG. 3, the folder 7 consists of a separating plate 7A, a lower folder 7B, and an upper folder 7C.

Figure 8:
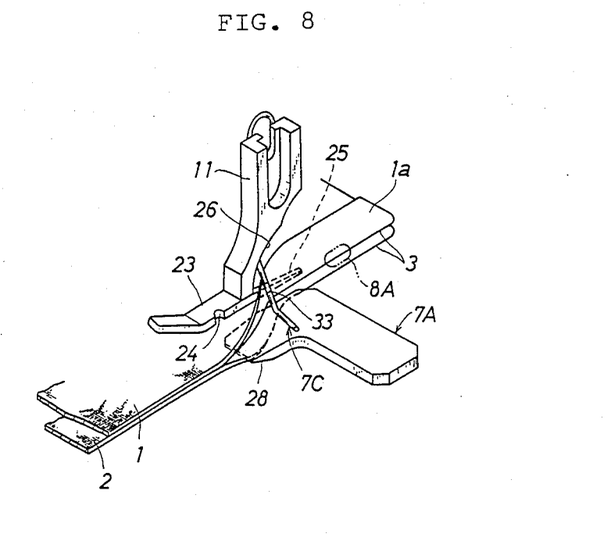
FIG. 8 is a schematic perspective view of two cloths being sewn by the sewing machine.

As shown in FIG. 1, the separating plate 7A is L-shaped and is attached on the rear right of the needle plate 10 by a screw 27. A wedge portion 28 projects forward at the left end of the separating plate 7A, and is situated on the right of the pressing portion 23 and the presser tongue 25 of the presser foot 11. The wedge portion 28 is tapered at its front edge. As shown in FIG. 8, during sewing, the wedge portion 28 intervenes between the upper and lower edges 1a and 2a in accordance with the movement of the cloths fed by the feed mechanism. The edges 1a and 2a are guided in opposite directions, i.e., the edge 1a of the upper cloth 1 is guided upward and the edge 2a of the lower cloth 2 is guided downward. As shown in FIG. 1, a projecting pin 30 formed on the needle plate 10 is inserted into an oblong hole 29 of the separating plate 7A.

Figure 9:
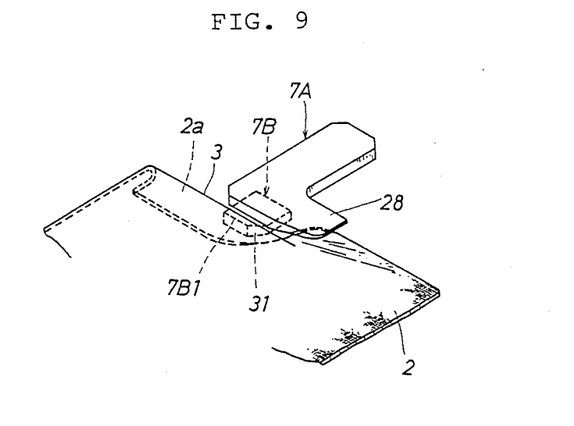
FIG. 9 is a schematic perspective view of a folded lower cloth.

As shown in FIG. 9, the lower folder 7B is integrally formed on the lower surface of the wedge portion 28 of the separating plate 7A. The lower folder 7B is an almost square plate, and has a portion 7B1 extending leftward from the left side of the separating plate 7A, and a cutoff 31 is formed at its left front. The cutoff 31 folds back the edge 2a of the lower cloth 2 guided by the wedge portion 28. Namely, the edge 2a of the lower cloth 2 is bent downward by the cutoff 31 and then folded by the top surface of the extending portion 7B1 by the cutoff 31. Preferably, the front edge of the lower folder 7B and the cutoff 31 are beveled so as to facilitate the folding of the edge 2a.

As shown in FIG. 2, the upper folder 7C is a bent wire. The upper portion of the folder 7C is U-shaped to be attached to the upper left side of the presser foot 11 by the presser clamp screw 22 and another screw 32. As shown in FIG. 8, the folder 7C then passes down behind the recess 26 of the presser foot 11, and forms a guide portion 33. The horizontally bent tip of the guide portion 33 of the upper folder 7C resiliently abuts the top of the separating plate 7A. The guide portion 33 turns up and folds the edge 1a of the upper cloth 1 guided by the wedge portion 28.

Figure 13:
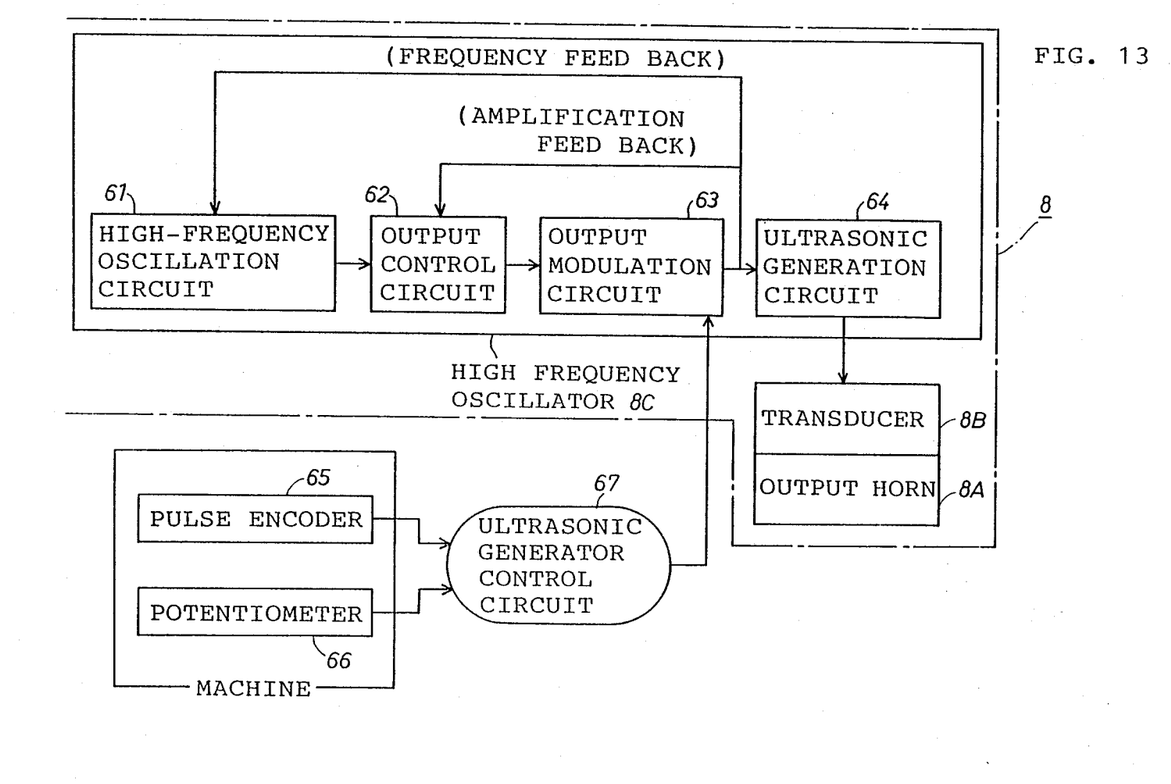
FIG. 13 is a block diagram of the control of the ultrasonic generator.

The ultrasonic-wave generating apparatus 8 makes creases 3 along the folded lines of the edges 1a and 2a by the folders 7B and 7C. As shown in FIG. 2, a body 34 of the apparatus 8 is supported at the left of an arm 12 by means of a supporting member 9. As shown in FIG. 13, the ultrasonic-wave generating apparatus 8 includes a high-frequency oscillator 8C; a resonant-magnetostriction type piezoelectric transducer 8B; and an output horn 8A for transmitting and amplifying the ultrasonic vibration. The oscillator 8C and the transducer 8B are installed in the body 34, and the output horn 8A projects from the lower end of the body 34. The electrical constitution of the ultrasonic-wave generating apparatus 8 will be described later.

Figure 10:
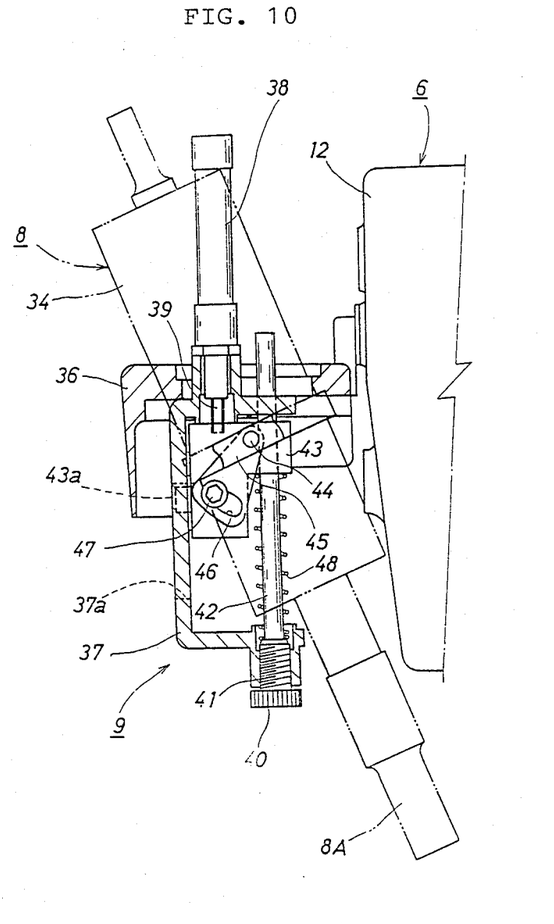
FIG. 10 is a side elevation view, partly in cross section of a supporting member of an ultrasonic generator of the embodiment.

The supporting member 9 of the ultrasonic-wave generating apparatus 8 is described hereinafter, referring to FIG. 10.

An almost U-shaped supporter 37 is attached to the rear left end of the arm 12 via a bracket 36. A pusher cylinder 38, which is an air cylinder, is vertically provided on the top of the supporter 37. A guide shaft 42 is vertically attached to the lower portion of the supporter 37 by a threaded portion 41 of a knob 40. An elevator 43 is movably provided at the guide shaft 42 and engaged with an expansion rod 39 projecting downward from the pusher cylinder 38. A holder 45, rotatably supported at the side surface of the elevator 43 via a shaft 44, grips the body 34 of the ultrasonic-wave generating apparatus 8. A screw 47 passes through an aperture 46 of the holder 45, which is an arc with respect to the shaft 44, in order to rotatably fix the holder 45 to the elevator 43. A spring 48 is provided around the guide shaft 42 between the end of the thread portion 41 of the knob 40 and the lower surface of the elevator 43. Therefore, the body 34 is raised and lowered with the elevator 43 in response to the contraction and expansion of the pusher cylinder 38. The setting angle of the body 34 and likewise the angular relationship between the tip 8D of the horn 8A and the needle plate 10 can be adjusted by loosening the screw 47, rotating the holder 45 with respect to the shaft 44 and retightening the screw 47. The elevator 43 has a projection 43a slidable within a longitudinal hole 37a of the supporter 37.

Figure 6:
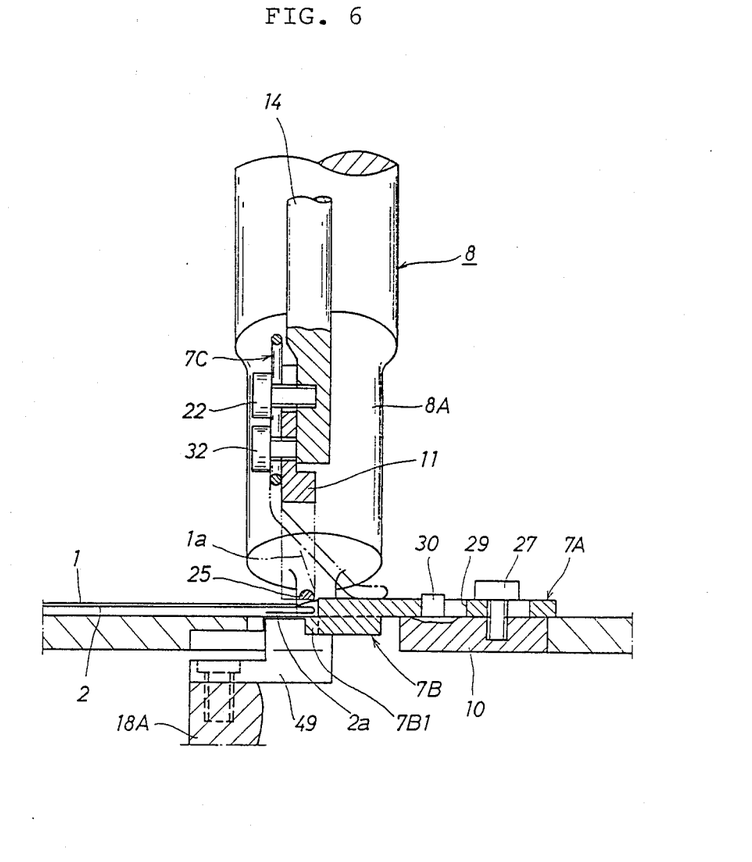
FIG. 6 is a sectional view taken along line VI—VI of FIG. 3.
Figure 7:
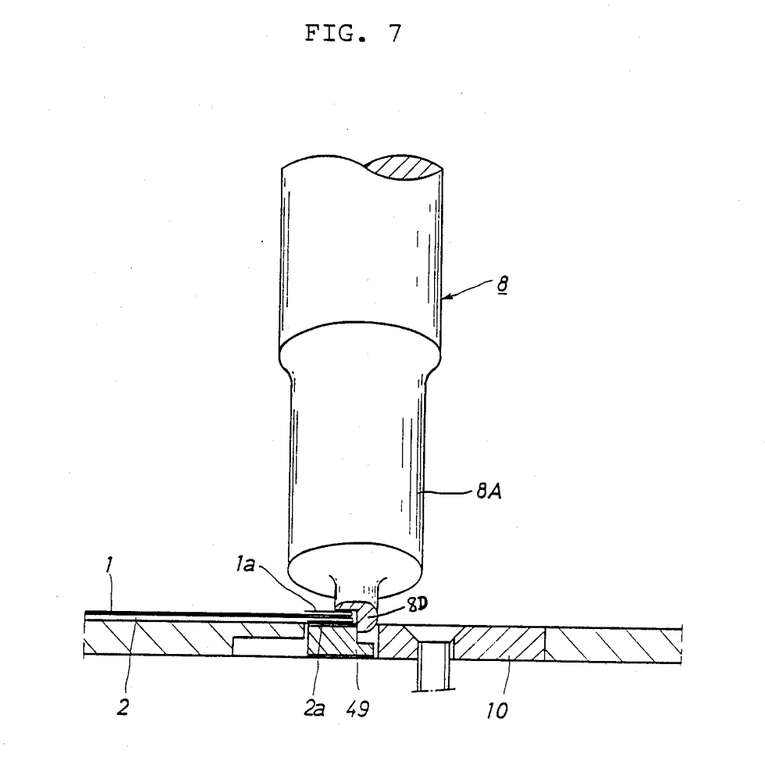
FIG. 7 is a sectional view taken along line VII—VII of FIG. 3.

When the ultrasonic-wave generating apparatus 8 is lowered by the mechanism as described above, as shown in FIG. 7, the tip of the output horn 8A is set over an anvil 49 at the rear of the feed dog 18 to press the folded back edges 1a and 2a of the sewn up cloths 1 and 2. As shown in FIGS. 3, 4, 5, and 6, the anvil 49 is provided n the feed bar 18A at the rear of the feed dog 18 and moves with the feed dog 18. While the feed dog 18 rises above the needle plate 10 and feeds the cloths 1 and 2, as shown in FIG. 7, the folded back edges 1a and 2a are pressed between the anvil 49 and the output horn 8A. The tip 8D of the output horn 8A is up-side down L-shaped and fits with the L-shaped edge of the anvil 49, where the edges 1a and 2a are pressed therebetween during feeding. At the moment feeding is not operated, the anvil 49 separates from the tip of the output horn 8A. Therefore, the edges 1a and 2a are scarcely heated while the teeth 18B of the feed dog 18 are below the top surface of the needle plate 10, thus the folds of the edges 1a and 2a of the cloths 1 and 2 are uniformly heated. As shown in FIG. 10, The pressing force between the output horn 8A and the anvil 49, which can be adjusted by the knob 40, is determined by the elasticity of the spring 43 and the push stroke of the cylinder 38.

Figure 11:
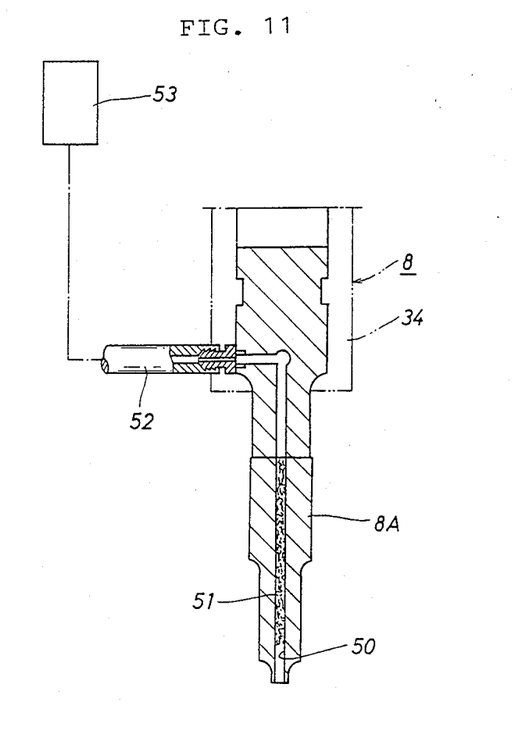
FIG. 11 is a sectional view of an output horn of the ultrasonic generator.

As shown in FIG. 11, the output horn 8A has a supply conduit 50 at its center for supplying water to the tip of the output horn 8A. The supply conduit 50 is filled with water-saturated material 51 such as fiber, e.g., cotton. The top end of the supply conduit 50 is communicated with a water tank 53 via a communicating tube 52. The water tank 53 is provided on a bobbin winder base (not shown) so that water from the water tank 53 gravitationally flows down to the supply conduit 50.

Operation

When the sewing machine is started, sewing of the cloths 1 and 2 is begun with the vertical reciprocation of the needle 16. At the same time, the ultrasonic-wave generating apparatus 8 is lowered by the pusher cylinder 38, and the piezoelectric transducer 8B starts generating ultrasonic waves.

Figure 5:
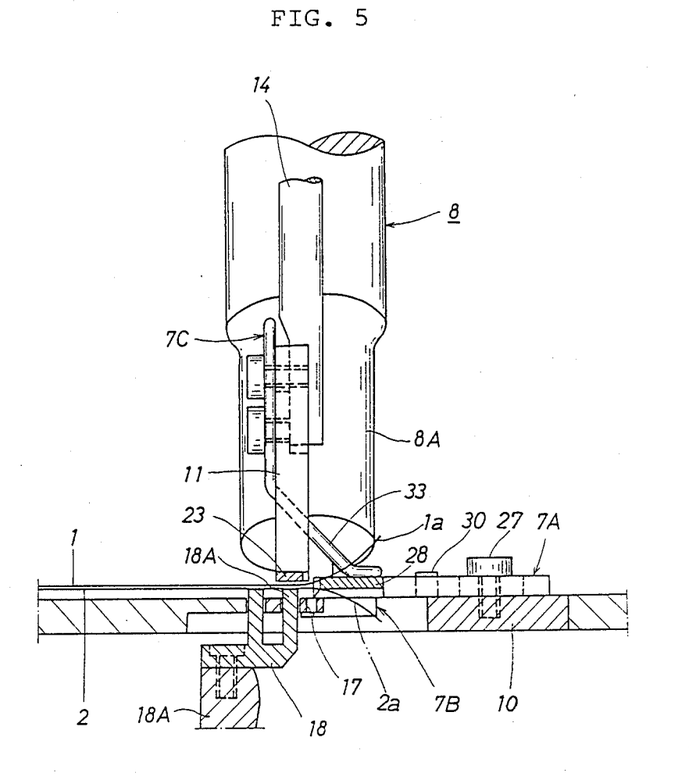
FIG. 5 is a sectional view taken along line V—V of FIG. 3.

As shown in FIGS. 5, 8, and 9, the edges 1a and 2a of the upper and lower cloths 1 and 2 are separated by the wedge portion 28 of the separating wedge 7A.

While the cloths 1 and 2 are fed to be sewn, the presser tongue 25 of the presser foot 11 presses a seam line of the cloths 1 and 2. As shown in FIGS. 6 and 8, with the feeding, the edge 1a of the upper cloth 1 is raised and folded back along the presser tongue 25 by the guide portion 33 of the upper folder 7C. At that time, the edge 1a passes between the guide portion 33 of the upper folder 7C and the recess 26 of the presser foot 11. Simultaneously, as shown in FIG. 9, by the action of the cutoff 31 of the lower folder 7B, the edge 2a of the lower cloth 2 is turned down and folded back 180° by means of the extending portion 7B1 and the side of the separating wedge 7A along the seam line under the press tongue 25. The folds of the edges 1a and 2a of the cloths 1 and 2 are guided to the tip of the output horn 8A. Since the tip of the output horn 8A is inclined right-upward as shown in FIG. 2, the folds can easily enter between the tip of the output horn 8A and the anvil 49.

As shown in FIG. 7, the tip of the output horn 8A abuts the folds of the cloths 1 and 2. Also, the anvil 49 is pushed against the tip of the output horn 8A via the cloths 1 and 2 when the feed bar 18A is raised by its feeding motion. At that time, ultrasonic vibration is applied to the folds of the cloths 1 and 2. Consequently, the portion of the cloth on which the tip of the output horn 8A abuts is heated, thereby the creases 3 are produced on the cloths 1 and 2.

This heating caused by the ultrasonic vibration from the ultrasonic-wave generating apparatus 8 occurs to the cloths 1 and 2 only when the cloths 1 and 2 are pinched in between the output horn 8A and the anvil 49. Therefore, in the present invention, it is possible to start and stop heating very quickly. Also, it is possible to control the heat capacity by changing the vibration frequency. The output horn 8A itself does not heat so that an operator does not get burned on the hand even if he touches it. Furthermore, as the cloths 1 and 2 are heated only while moving, the cloth does not get burned, and fire is avoided. Therefore, the present invention improves efficiency and safety.

At the same time that ultrasonic vibration is applied to the cloths 1 and 2, water in the supply conduit 50 is vaporized onto the cloths 1 and 2. The water is heated by the heating of the cloths 1 and 2 so that the creases 3 are more effectively formed on the cloths 1 and 2.

The anvil 49, provided on the feed bar 18A in this embodiment, may be provided on the needle plate 10. Further, without the anvil 49, the edges 1a and 2a may be pinched in between the tip of the horn 8A and the needle plate 10. In these cases, the ultrasonic wave from the horn 8A is intermittently generated only at every feeding step by means of the control circuit described below.

The control block diagram in FIG. 13 will be described herein-after. The high-frequency oscillator 8C includes: a high-frequency oscillation circuit 61 which oscillates a high-frequency signal, i.e., rectangular pulses corresponding to the frequency of ultrasonic wave generated from the output horn 8A; an output control circuit 62 which converts the rectangular pulses into a sinusoidal wave signal and amplifies the voltage thereof to a preset level; an output modulation circuit 63 in which the input sinusoidal voltage wave signal is modulated or amplified in accordance with a control signal from an ultrasonic generator control circuit 67; and an ultrasonic generation circuit 64 which converts the amplified signal to a driving signal for outputting ultrasonic waves, and supplies it to the piezoelectric transducer 8B.

The frequency of the power-amplified signal output from the output modulation circuit 63 is monitored, fed back to the high-frequency oscillation circuit 61, and compared with a preset value. If there is deviation, the frequency is controlled to be nearly the preset value. On the other hand, the power-amplified signal is also monitored, fed back to the output control circuit 62, and compared with a preset value. If there is deviation, the amplification is controlled to be nearly the preset value.

Figure 14:
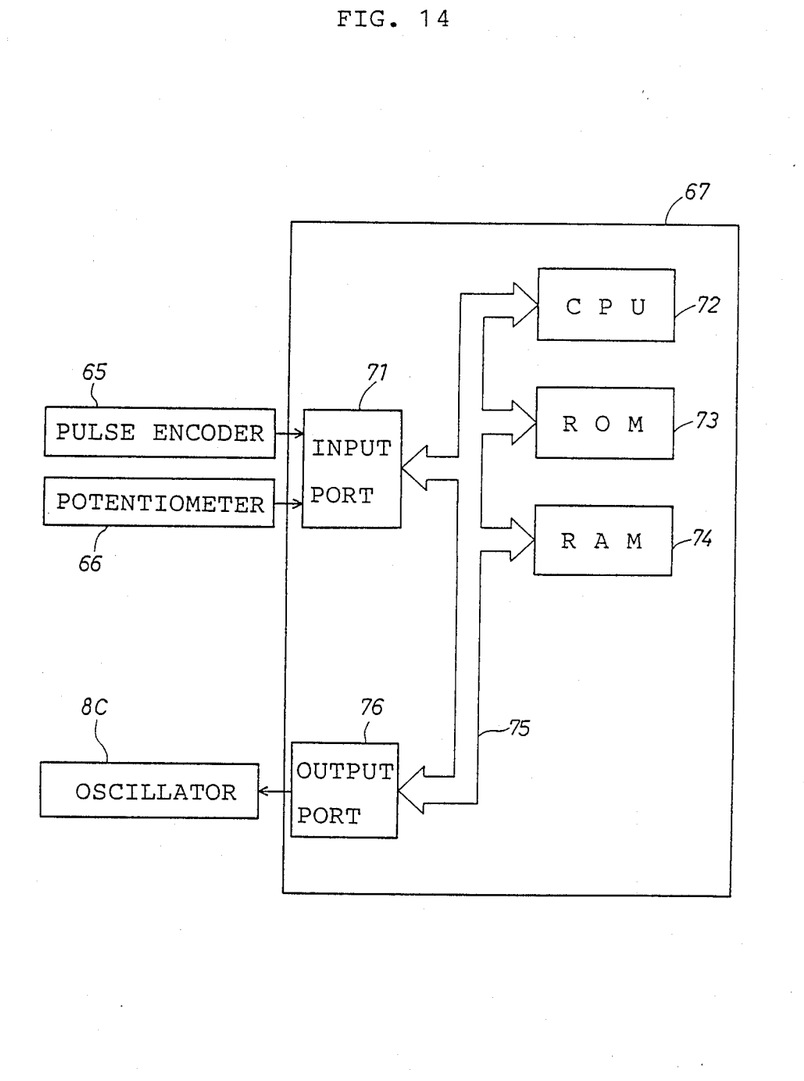
FIG. 14 is a block diagram showing a schematic structure of an ultrasonic generator control circuit.

A pulse encoder 65 is attached to a main shaft (not shown) on which the pulley 60 (shown in FIG. 2) is fixed, in order to sense the rotational speed of the main shaft and output a pulse signal corresponding to the rotational speed. A potentiometer 66 is provided at a feed regulator (not shown) in order to sense the feeding pitch of the cloths 1 and 2. The pulse encoder 65 and the potentiometer 66 are connected to an ultrasonic generator control circuit 67. FIG. 14 is a block diagram of the ultrasonic generator control circuit 67. The circuit 67 includes: an input port 71 connected to the pulse encoder 65 and the potentiometer 66; CPU 72; ROM 73 storing programs for the control; RAM 74; a bus line 75; and an output port 76 which is connected to the output modulation circuit 63. The ultrasonic generator control circuit 67 calculates the sewing speed based on the pulse signal from the pulse encoder 65 and the voltage signal from the potentiometer 66, generates a suitable control signal for the sewing speed and outputs the control signal to the output modulation circuit 63. Then, the output modulation circuit 63 adjusts its amplification in accordance with the control signal. Therefore, heat capacity given to the folds of edges 1a and 2a is kept close to an optimal value even if the sewing speed is changed. For example, the heat generated per unit length of the sewn cloths is kept constant irrespective of the speed.

Figure 15:
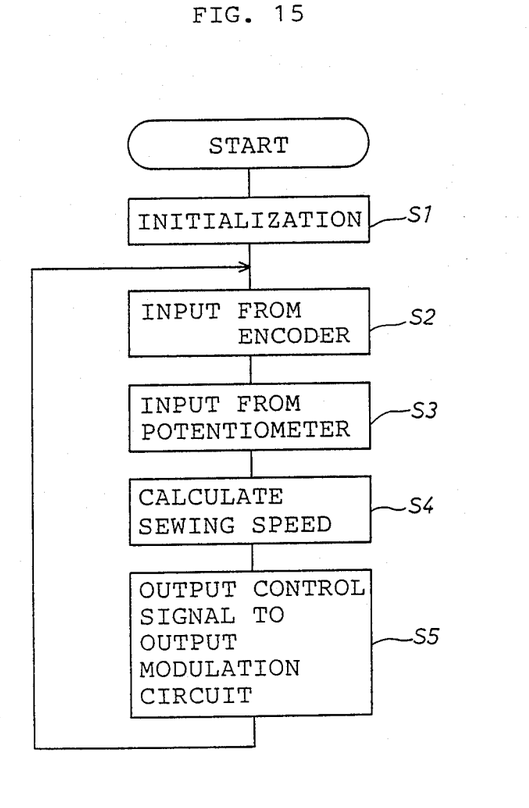
FIG. 15 is a flow chart of the control of the ultrasonic generator.

The operation of the ultrasonic generator control circuit 67 is described hereinafter, referring to the flow chart in FIG. 15.

The machine 6 is powered on and the control circuit is initialized at step S1. At this stage, sewing together the cloths 1 and 2 is begun. The body 34 and the horn 8A are lowered by the pusher cylinder 38 and the ultrasonic-wave generating apparatus 8 start emitting ultrasonic waves toward the folds of the edges 1a and 2a of the cloths 1 and 2.

The pulse signal output from the pulse encoder 65 corresponding to the rotational speed of the main shaft, i.e., the speed of the vertical movement of the needle 16, is read at S2. The voltage signal output from the potentiometer 66 corresponding to the feed pitch of the cloths 1 and 2 is read at S3. The sewing speed is calculated based on the pulse signal and the voltage signal at S4. A control signal for controlling the ultrasonic wave intensity based on the calculated sewing speed is output to the output modulation circuit 63 at S5. Then the process step returns to S2 and repeats steps S2 through S5 thereafter until the power is off. The modulation circuit 63 adjusts its amplification based on the control signal in order to automatically control heat capacity given to the folds of the edges 1a and 2a to be constant.

Although the invention has been described and illustrated in detail, it is to be clearly understood that the same is by way of illustration and example only and not by way of limitation. The spirit and scope of this invention are to be limited only by the terms of the appended claims.

What is claimed is:

1. A sewing machine for sewing together edges of two sheets of material, for folding back the sewn edges and for creasing the folded edges, comprising:
    stitch-forming means for forming a stitch at a sewing point;
    feeding means for feeding in a feeding direction the two sheets of material through the sewing point;

folding means for turning apart and folding back each edge of the two sheets of material;

an anvil provided downstream of said folding means with respect to the feeding direction of the material;

including a tip means for an ultrasonic horn cooperating with said anvil for heating the folded back edges of the two sheets of material to crease the same by means of ultrasonic waves;

an ultrasonic generator provided for said ultrasonic horn; and a horn adjuster provided on a frame of the sewing machine including means for moving said tip to a specific angular position in relationship to a sewing support surface, said adjuster including further means to push said horn towards said anvil with the two sheets of material therebetween.

2. A sewing machine for sewing together edges of two sheets of material, for folding back the sewn edges and for creasing the folded back edges, comprising:

stitch-forming means for forming a stitch at a sewing point;

feeding means for feeding in a feeding direction the two sheets of material through the sewing point;

folding means for turning apart and folding back each edge of the two sheets of material;

an anvil provided downstream of said folding means with respect to the feeding direction of the material;

an ultrasonic horn cooperating with said anvil for heating the folded back edges of the two sheets of material to crease the same by means of ultrasonic waves;

an ultrasonic generator provided for said ultrasonic horn;

a speed sensor for sensing a sewing speed of the sewing machine; and a control device for controlling said ultrasonic generator to vary a strength of the ultrasonic wave responsive to the sensed sewing speed.

3. A sewing machine according to claim 3, wherein:
said ultrasonic generator comprises
an oscillator for generating a pulse signal, a frequency of the pulse signal corresponding to a frequency of said ultrasonic waves,
a signal converter for converting the pulse signal into a sinusoidal voltage wave signal,
an amplifier for amplifying the sinusoidal voltage wave signal,
an ultrasonic converter for generating a drive current responsive to the amplified signal, and
a transducer for generating the ultrasonic wave responsive to the drive current, and
said control device controls the amplifier responsive to the sensed sewing speed, whereby the same amount of energy of the ultrasonic wave is generated by said ultrasonic generator per unit length of the sewn material.

4. A sewing machine for sewing together edges of two sheets of material, for folding back the sewn edges and for creasing the folded edges, comprising:
stitch-forming means for forming a stitch at a sewing point;
feeding means comprising a feed dog supported on a feed bar for feeding in a feeding direction the two sheets of material through the sewing point;
folding means for turning apart and folding back each edge of the two sheets of material;
an anvil provided downstream of said folding means with respect to the feeding direction of the material;
an ultrasonic horn cooperating with said anvil for heating the folded back edges of the two sheets of material to crease the same by means of ultrasonic waves; and
an ultrasonic generator provided for said ultrasonic horn,
wherein said anvil is formed on said feed bar.

5. A sewing machine for sewing together edges of two sheets of material, for folding back the sewn edges and for creasing the folded edges, comprising:
stitch-forming means for forming a stitch at a sewing point;
feeding means for feeding in a feeding direction the two sheets of material through the sewing point;
folding means for turning apart and folding back each edge of the two sheets of material;
an anvil provided downstream of said folding means with respect to the feeding direction of the material;
an ultrasonic horn cooperating with said anvil for heating the folded back edges of the two sheets of material to crease the same by means of ultrasonic waves; and
an ultrasonic generator provided for said ultrasonic horn,
said folding means comprising:
a separating wedge for separating the edges of the two sewn sheets;
an upper folder formed by L shaped wire, an upper end of the wire being attached to a presser foot and a lower bent end of the wire resiliently abutting on an upper surface of the separating wedge; and
a lower folder formed by a rectangular thick plate attached on a lower surface of the separating wedge, having an edge extending from the wedge and a cutoff at a front corner of the extending edge.

6. A sewing machine for sewing together edges of two sheets of material, for folding back the sewn edges and for creasing the folded edges, comprising:
stitch-forming means for forming a stitch at a sewing point;
feeding means for feeding in a feeding direction the two sheets of material through the sewing point;
folding means for turning apart and folding back each edge of the two sheets of material;
an anvil provided downstream of said folding means with respect to the feeding direction of the material;
an ultrasonic horn cooperating with said anvil for heating the folded back edges of the two sheets of material to crease the sane by means of ultrasonic waves; and
an ultrasonic generator provided for said ultrasonic horn,
a path for conducting a liquid provided in the ultrasonic horn, the path being filled with a liquid saturated material, whereby the liquid deposited on the material from an outlet of said path is vaporized by the ultrasonic wave and the sewn edges are creased by the vaporized liquid and the heat generated by the ultrasonic wave.

7. A sewing machine for sewing together edges of two sheets of material, for folding back the sewn edges and for creasing the folded edges, comprising:

stitch-forming means including a needle which reciprocates across the two sheets of material for forming a stitch at a sewing point;

feeding means for intermittently feeding in a feeding direction the two sheets of material through the sewing point only while said needle is disengaged with said two sheets of material;

folding means for turning apart and folding back each edge of the two sheets of material;

a material supporting surface provided downstream of said folding means with respect to the feeding direction of the material;

an ultrasonic horn cooperating with said material supporting surface for heating the folded back edges of the two sheets of material to crease the same by means of ultrasonic wave;

an ultrasonic generator provided for said ultrasonic horn; and a control device for controlling said ultrasonic generator to emit the ultrasonic wave only while said feed means is operating to feed said tow sheets.

8. A sewing machine according to claim 2, further comprising control means for varying a strength of the ultrasonic wave generated by the ultrasonic generator.

* * * * *